United States Patent [19]

Greer

[11] Patent Number: 4,898,092
[45] Date of Patent: Feb. 6, 1990

[54] FEED GRAIN CONDITIONING APPARATUS

[75] Inventor: David G. Greer, Anoka, Minn.

[73] Assignee: AgriChem, Inc., Anoka, Minn.

[21] Appl. No.: 191,378

[22] Filed: May 9, 1988

[51] Int. Cl.⁴ .......................................... A23N 17/00
[52] U.S. Cl. ...................................... 99/487; 99/516; 99/536
[58] Field of Search .................. 99/485–487, 99/489, 516, 536, 468, 473, 483; 134/132; 364/502, 468, 469, 476, 148, 173; 366/76, 156, 168, 172; 137/2

[56] References Cited

U.S. PATENT DOCUMENTS

| | | |
|---|---|---|
| 2,163,628 | 6/1939 | Pilkey . |
| 2,237,798 | 4/1941 | Thomas . |
| 2,324,874 | 7/1943 | Peters . |
| 2,553,788 | 5/1951 | Richardson et al. . |
| 3,029,829 | 4/1962 | Glueck . |
| 3,547,081 | 12/1970 | Geerlings . |
| 3,587,529 | 6/1972 | Wienert . |
| 3,684,526 | 8/1972 | Lowery . |
| 3,703,861 | 11/1972 | Slack et al. ............. 99/471 X |
| 3,717,086 | 2/1973 | Hough ..................... 99/471 X |
| 3,721,179 | 3/1973 | Applegate . |
| 3,734,777 | 5/1973 | Bratschitsch . |
| 3,809,922 | 5/1974 | Emmons et al. . |
| 3,932,736 | 1/1976 | Zarow et al. ............. 99/487 X |
| 3,991,771 | 11/1976 | Banks . |
| 4,148,325 | 4/1979 | Solomon et al. . |
| 4,182,273 | 1/1980 | Peterson . |
| 4,183,292 | 1/1980 | Banks . |
| 4,407,306 | 10/1983 | Hibbitts . |
| 4,471,790 | 9/1984 | Davis, Jr. et al. . |
| 4,572,218 | 2/1986 | Hine et al. . |
| 4,628,807 | 12/1986 | Dopp . |
| 4,654,802 | 3/1987 | Davis . |
| 4,680,957 | 7/1987 | Dodd . |
| 4,721,448 | 1/1988 | Irish et al. ............... 99/517 X |
| 4,742,463 | 5/1988 | Volk, Jr. .................. 364/468 |

Primary Examiner—Timothy F. Simone
Attorney, Agent, or Firm—Burd, Bartz & Gutenkauf

[57] ABSTRACT

This invention is an apparatus and method for automatically adjusting the moisture content of feed grains to a relatively constant target level. As the grain is transported into, or within the feed manufacturing process, a sample is diverted through a continuous flow moisture sensor. The sensor generates an electronic signal proportional to the moisture content of the grain. This signal is used to control the application rate of a surfactant—water mixture, or of water alone. The water may be either in the form of steam or, as a hot or cold liquid. The grain then enters a mixing or contact chamber, into which the water is metered at a rate that is proportional to the moisture content of the incoming grain. The treated grain will have a relatively constant moisture content, eliminating one of the largest variables in the manufacturing of livestock feeds.

25 Claims, 2 Drawing Sheets

FEED GRAIN CONDITIONING APPARATUS

BACKGROUND OF THE INVENTION

Moisture content of feed grains is critically important to the quality and palatability of the finished feed. It also has a significant impact on the ease with which they are processed into feed, but has been a largely uncontrollable variable in the feed manufacturing process. Moisture levels encountered typically range between eight and sixteen percent in stored grain. New crop grain can have moisture levels in excess of twenty percent. A feed manufacturing facility will commonly process several hundreds of tons of feed grains each day that have been purchased from many sources. Within a matter of minutes the moisture content of the grain being processed can vary several percentage points. Without regulated moisture addition, a highly varible feed product is produced.

The processing of feed grains in the manufacturing of finished livestock feeds is intended to increase the feed value of the grains. "Value" is defined in terms of palatibility and digestibility. The most simple processing involves either the grinding or dry rolling of the whole kernel grain to fracture the seed coat and to increase the surface area of the grain particles for more efficient digestion. Grain moisture content greatly affects the texture of the final products produced by these dry methods. Very dry grain will tend to make flour, which the animals will not eat, rather than the desired larger particle. This flour, or dust, represents a safety hazard in the feed mnufacturing facility, both from the explosion potential and from workers breathing it. It also represents a loss of inventory to the feed manufacturer. Careful control of the moisture level of the grain entering these dry processes can eliminate dust and help to produce a uniform particle size that will improve digestion without being so small as to depress consumption. Swine and beef cattle feeds are commonly prepared with dry processed grain.

A more sophisticated method of processing feed grains involves cooking them with steam before they are passed through a roller mill. The cooking partially gelatinizes the starch in the grain, increasing its digestibility. The rolling increases surface area of the grain kernel by pressing it into a flat "flake". Beef and dairy cattle feeds are commonly steam flaked. Whole kernel grain flows through a chamber into which live steam is injected. Once "cooked", it passes through a roller mill, producing a "flake". If the grain is too dry, the cooking or gelatinizing will be incomplete, since the gelatinizing process requires both heat and moisture. The grain kernel will be hard and require more energy to roll than a moist, properly cooked kernel. The final flake will be dry and brittle. Subsequent handling of the flake will cause it to break, resulting in "fines" that the animal will not eat readily.

A second processing method involving steam cooking of the grain is pelleting, which is commonly used to prepare poultry feeds. The grain is ground to a uniform texture, mixed with other feed ingredients and treated with steam. The resulting mash is extruded through a die in a pellet mill. As with steam flaking, gelatinization and toughness of the final feed form, are greatly influenced by the moisture content of the grains being processed. The power required to drive the pellet mill is also affected by the moisture content of the mash. If it is too dry, more power will be required to extrude the pellet, the cooking will be incomplete and the feed ingredients will not bond well, causing a weak pellet that falls apart. Broken pellets become "fines" that are not eaten and represent a loss to the livestock producer.

SUMMARY OF THE INVENTION

The invention relates to an apparatus and method for continuous, on-line moisture content monitoring and precisely calibrated adjustment of the moisture content of feed grains being used to manufacture livestock feeds. A continuous flow moisture sensor that is positioned to receive and measure the moisture content of a sample of passing feed grains is used to generate an electronic signal indicative of the grain moisture content as the grain flows through the sampling site. A moisture application apparatus is provided for regulated addition of moisture to the feed grain and receives the electronic signal generated by the moisture sensor. This signal is used as a control signal to adjust moisture addition rate necessary to bring the grain moisture to an optimum level for processing. The added moisture may be in the form of steam, hot or cold water, or a water-surfactant mixture, and is metered into a mixing or contact chamber through which the grain flows. In a preferred embodiment, the moisture is added to the feed grain in a mixing chamber such as an auger housing where the water mixture is thoroughly mixed with the grain.

DESCRIPTION OF A PREFERRED EMBODIMENT

Figure 1:
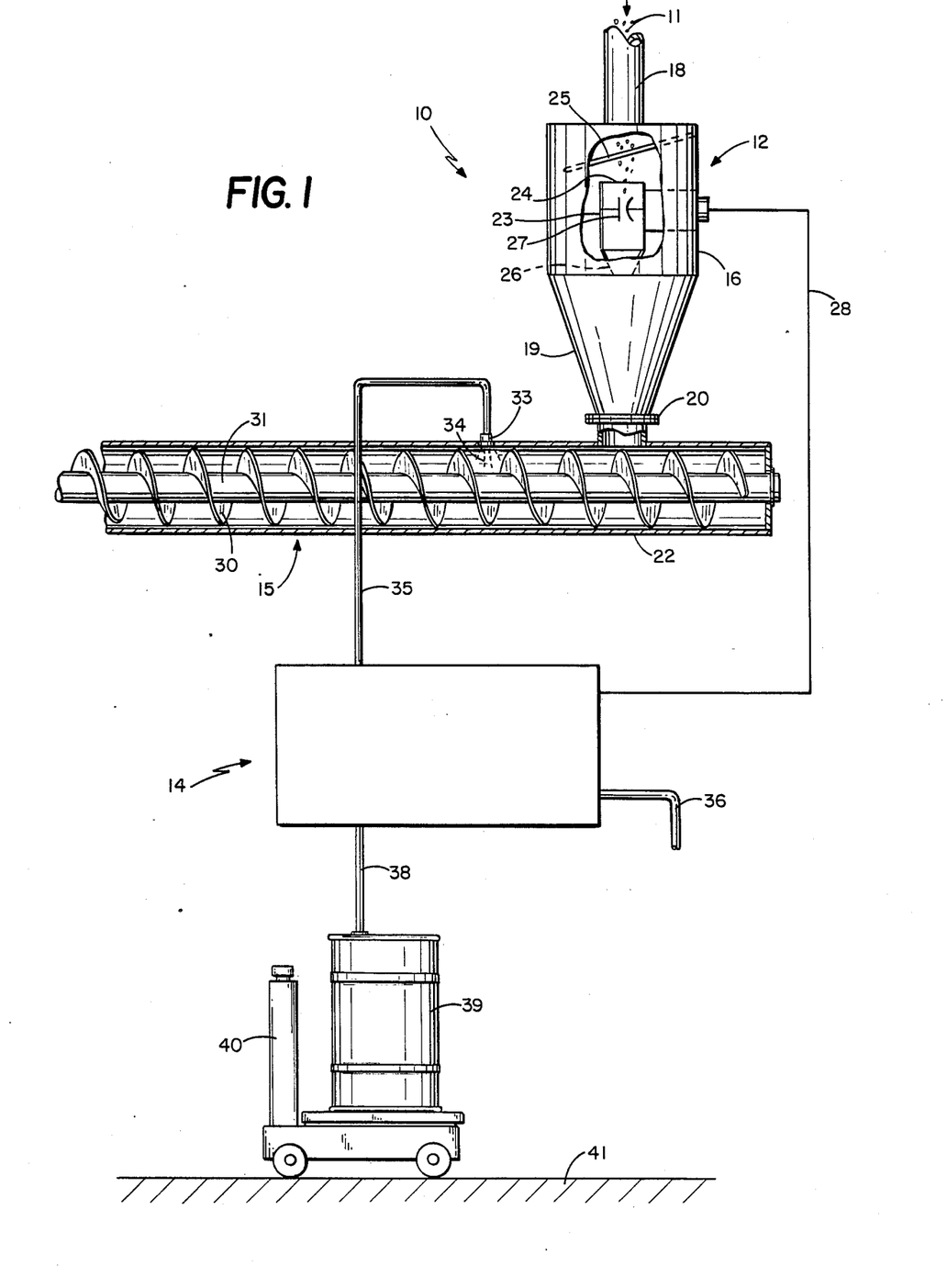
FIG. 1 is a schematic view of the grain moisturizing apparatus of the invention partly fragmented for purposes of illustration.

Referring to the drawings, there is shown in FIG. 1 the grain moisturizing apparatus of the invention indicated generally at 10 positioned to intercept flowing feed grain 11 for conditioning it through the addition of water either alone or mixed with a fluid additive such as a nutrient, a surfactant or a flavoring agent. Grain 11 is feed grain such as milo, corn, oats, barley or wheat, that has a relatively low initial moisture content. The purpose of the addition of the wetting agent is to bring the moisture content up to a uniform target level, for example, 18–18.5 percent, so as to be more palatable to the animal and more readily digested by the animal, yet not to exceed that desired moisture level. The grain as introduced to apparatus 10 will be of varying moisture content. Grain that has been in storage will have a relatively low moisture content, while grain more freshly harvested will usually be somewhat higher. Apparatus 10 continuously senses and monitors the moisture content of the passing grain and adjusts the amount of wetting agent and moisture added.

Grain 11 is flowing from a location of origin such as a storage bin, an elevator or a grain truck, and is traveling or flowing usually in a downstream direction of travel to a destination such as a surge bin, roller mill, steam chamber, a feed mixer or the like, preparatory to being fed to livestock. The grain flow is directed through the moisturizing apparatus 10 for conditioning. The grain travels past a sensing station 12 where a sample is diverted through a moisture sensor. Sensing station 12 is located upstream of the grain flow with respect to a wetting station 14. The grain is transferred from the sensing station 12 to and beyond the wetting station 14 by a mixing and transfer apparatus 15. In apparatus 15 grain is not only moved along to the destination location, but the wetting agent is thoroughly mixed into the grain.

Sensing station 12 includes a sensor mounting box or housing 16. The outlet end of a grain conveyor or pipe 18 connects to the inlet end of housing 16 for transfer of the entire amount of flowing grain through the interior of housing 16. The lower or outlet end of housing 16 has a downwardly divergent, truncated conical outlet section 19 assembled by a flanged connection 20 to an auger housing 22 forming a part of the mixing and transfer apparatus 15. The grain 11 having a measurable moisture content flows from the origin location through the grain conduit pipe 18, then through the interior of sensor mounting housing 16 to the interior of auger housing 22.

A moisture sensor apparatus 23 is installed within the interior of the sensor housing 16 in blocking relationship to a portion of the passageway of the grain 11 as it travels toward the auger housing 22. Moisture sensor apparatus 23 has an inlet opening 24 perpendicular to the longitudinal direction of flow of grain 11 and positioned to intercept a sample of the grain 11 as it passes through the housing 16. Scalper bars 25 are fixed to the interior sidewall of the housing 16 and extend over the upstream projection of inlet opening 24. Scalper bars 25 form a rake-like barrier of parallel bars spaced apart a distance sufficient to permit passage of grain 11 but deflect foreign objects that may be entrained with grain 11 such as padlocks, pieces of chain or metal and the like. The moisture sensor 23 has an outlet 26 in longitudinal alignment with the inlet 24 to permit return of the sample of grain directed through the sensor to the mainstream of grain flow. While within the moisture sensor 23, the moisture of the passing grain is detected by any common and preferred type of sensing mechanism. For example, a capacitor 27 can be mounted in the passage of the moisture sensor 23, having spaced apart capacitive plates positioned generally parallel to the flow of grain such that a grain sample flows between them. The capacitence between the plates will vary according to the moisture content of the passing grain. By passing grain samples of known moisture conent through the capacitor 27, the electronic output can be calibrated for a particular grain. The electronic signal can be in terms of a voltage. The higher moisture content of the grain, the greater the ability to conduct current across the capacitence plates. A typical calibration could be a voltage output of between 0 and 4 volts over the typical range of moisture content being measured. The output signal from the moisture sensor 23 is carried by electrical line 28 to the control station 14. The moisture sensor 23 provides continuous monitoring of the moisture content of grain passing from the conveyor 18 and through the sensor housing 16.

The grain sample deflected through the moisture sensor apparatus 23 is returned to the normal grain stream at outlet 26 and travels to the flanged inlet 20 of the mixing apparatus 15. Mixing apparatus 15 includes a tubular auger housing 22 having an auger flight 30 installed on an auger shaft 31 that is driven by suitable power such as an electric motor (not shown) at a controlled speed. The grain travels from the inlet 20 through the longitudinal length of the auger housing 22 to a discharge end for further processing or conveying to the destination location. A water-wetting agent mixture is applied to the grain in the auger housing 22 in an amount calibrated according to the electronic output provided by the moisture sensor 23. Auger flight 30 serves to thoroughly mix the water mixture and the grain preparatory to consumption by the animal.

Means for introduction of the water mixture to the grain comprises a spray nozzle 33 carrying water mixture in the form of pressurized spray product 34 and mounted on the side of auger housing 22. The liquid is delivered by a liquid line 35 extending from the control station 14, and is derived from a water supply line 36 and an additive supply line 38. The additive supply line 38 extends from control station 14 to a container 39 of additive such as a wetting agent. Container 39 rests on a commercial scale 40 supported on ground surface 41 for purposes of determining depletion of container 39. Spray product 34 is thoroughly mixed in with the passing grain by the auger flight 31 as it travels through the auger housing 22 to its destination. Other means for mixing the spray agent with the grain could be used such as mixing in a bin, a hopper or a conveyer belt moving the grain from the sensing station to the final destination.

Figure 2:
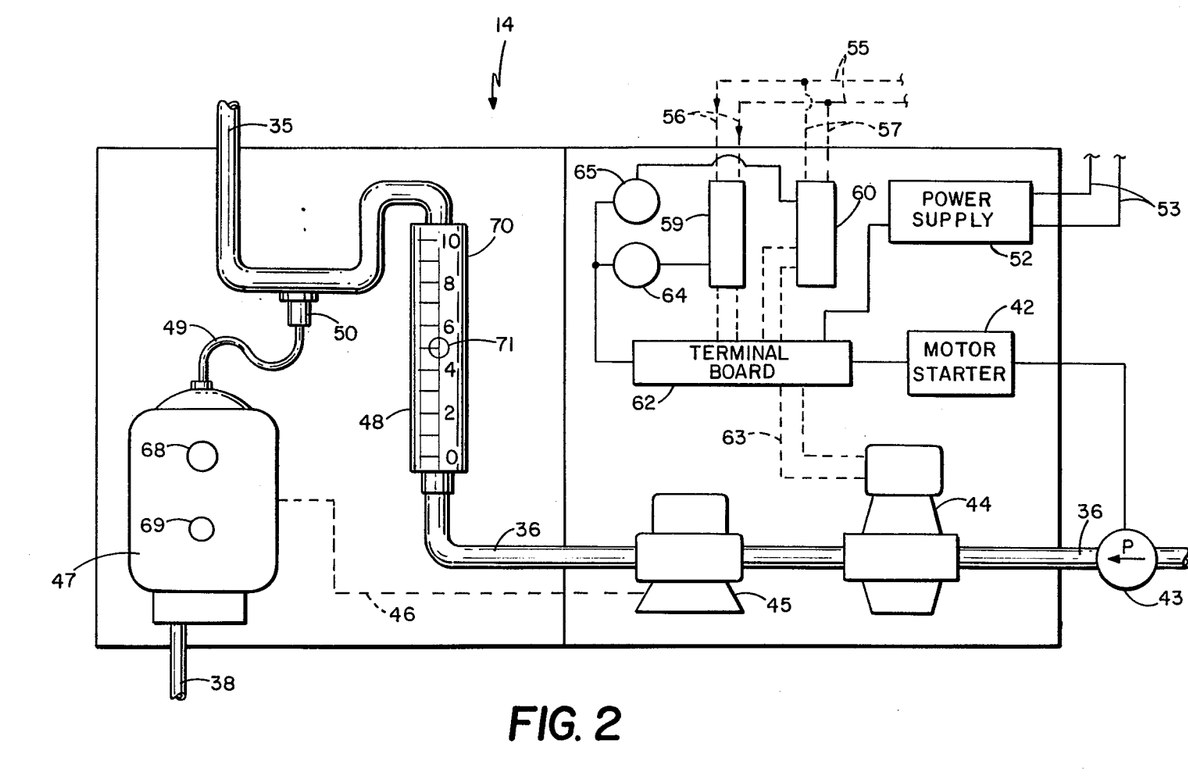
FIG. 2 is an enlarged schematic view of the control station of the grain moisturizing appartus of FIG. 1.

Referring to FIG. 2, water supply line 36 derives a supply of water under pressure from a remote water pump 43 as might be associated with a well, or from water tanks or a public water supply or the like. Water line 36 extends through an automatic water valve 44 that is under the control of the moisture sensor 23, and to the water meter pulsar 45. Water meter pulsar 45 produces an electrical control signal according to the water flow that is carried by signal line 46 to a chemical metering pump 47. The water supply line 36 extends from the water meter pulser 45 through a flow guage 48 and to the fluid supply line 35 leading to the spray nozzle 33. A delivery tube 49 extends from the chemical metering pump 47 to a fitting 50 connected to the water supply line 36 for introduction of an additive to the water supply. The additive is supplied to the chemical metering pump 47 by the additive supply line 38 extending from the additive container 39 shown in FIG. 1.

A power supply 52 provides power to the moisture sensor 23 through power lines 53, and to other electrical components located at control station 14. The output voltage of the moisture sensor is carried by main signal lines 55 through the electrical conduit 28 back to the control station 14. A first signal control branch 56 carries the signal voltage to a first signal converter terminal 59. The first signal converter terminal 59 converts the voltage signal to an amperage signal measureable in milliamps for control of the water valve 44. The milliamps signal output from the first signal control terminal is fed to a terminal board 62. Terminal board output lines 63 extend from the terminal board 62 to the automatic valve 44. The first signal converter terminal 59 is calibrated according to one type of grain being processed. For example, the first signal converter terminal 59 can be calibrated for corn. The calibration is wih reference to corn at a target moisture level. When the feed lot or operator is processing corn, the operator activates the first signal converter terminal 59.

A second branch 57 carries the voltage signal output of the moisture sensor 23 from the main signal line 55 to a second signal converter terminal 60. The second signal converter terminal 60 is also connected to the terminal board 62. Second signal terminal converter 60 is calibrated according to a second type of grain such as milo. This calibration will differ from that for the first signal converter terminal due to the differing characteristics of the two grains. Accordingly, when the operator of the apparatus is conditioning the second grain, the second signal converter terminal 60 will be actuated to the exclusion of the first signal converter terminal 59. The second signal converter terminal 60 converts the input voltage to an amperage, for example, in the range between 0-20 milliamps which is transmitted to the terminal board 62. Signal converter terminal is calibrated with respect to a target moisture content of the grain to open or close the automatic valve in an amount according to the voltage sensed by the moisture sensor for the particular grain being processed. First signal converter terminal 59 is controlled by a relay or switch 54. The second signal converter terminal 60 is actuated by a second relay or switch 65. Each signal converter terminal operates to the exclusion of the other, i.e., only one at a time can be actuated. The moisture sensed by the moisture sensor 23 is relayed to one of the signal converter terminals, then to the terminal board 62 before passing the signal through the output branch 63 to the automatic valve 44.

Water meter 45 measures the volume of water flow through the water line 36 and converts the information to an electrical signal that travels through signal line 46 to the additive meter pump 47 which pumps a correct or desired amount of additive through the connecting line 49 proportionate to the volume of water. Water meter 45 can be of the pulsar variety having a turbine mounted magnet that rotates responsive to water flow, generating a programmable electrical pulse transmitted to the metering pump to actuate the pump according to the volumetric water flow. Alternatively the metering pump 47 can also be controlled from the same signal that drives the control valve. Metering pump 47 has a stroke length control 68 and a frequency control 69 to regulate the rate of addition of additive to the water supply.

Flow meter 48 gives visual indicia of the water flow rate for reference purposes. Flow meter 48 comprises a vertical, transparent tubular member calibrated from bottom to top and open for passage of water. A ball or other weighted member 71 is located in the passage of tubular element 70 and is pushed upward along the sideways calibrations on the tubular member 70 according to the flow rate of the water. Other flow rate meters could be employed.

In the use of the flow moisturizing apparatus 10, the signal converter terminals one each calibrated according to a type of grain. For example, most feed lots condition one or two types of grains, but generally not more. The first signal converter terminal can be calibrated according to conditioning of corn, and the second for milo, or other grains. Grain samples with known moisture contents are passed through the moisture sensor, and the signal is measured. The grain sample can have a known moisture content as determined by AOAC standard laboratory methods. This is repeated for numerous data points. Thereafter, when the calibrated voltage is sensed by the moisture sensor, the moisture content of the grain is known. The automatic valve 44 is programmed to open or close according to a voltage sense signal directed to it. The voltage signal will be from one if the first or second signal converter terminals.

Grain from an origin location is passed through the grain pipe or conduit 18 through the sensor mounting housing 16. A sample of the grain, for example 4 or 5 percent of the grain, passes through the moisture sensor chamber defined by the sidewalls of moisture sensor 23, and then through the moisture sensor outlet 26 to be reunited with the main grain stream. The moisture content of the passing grain is sensed in moisture sendor 23. The information is transmitted through the main signal line 55 in electrical conduit 28 to the control station 14. The signal is diverted through either the first or second signal converter terminals, then through the terminal board 62 and the signal connecting line 63 to the automatic pump 44. A delay circuit can be interposed to account for the time lag for the grain to travel from the moisture sensor station to the wetting station at the spray nozzle 33. The automatic valve 44 opens, closes or remains in position according to the signal being sensed. The water flow is sensed by the water meter 45 which transmits a signal accordingly to the additive pump 47 and actuates the additive pump 47 to deliver a controlled amount of additive to the water supply at the fitting 50 to be added and mixed with the water in fluid supply line 35. The mixture then passes through the spray nozzle 33 into and is mixed with the grain, conditioning it preparatory to being fed to the animals. The additive is derived from the additive container 39 and delivered through the additive supply line 38 to the metering pump 47.

While there has been shown and described a preferred embodiment of the invention, it will be apparent that certain deviations can be had from the embodiment shown without departing from the scope and spirit of the invention.

The embodiments of the invention in which an exclusive property or privilege is claimed are defined as follows:

1. A feed grain conditioning apparatus for conditioning of feed grain to bring the moisture content to an approximate target moisture content through the addition of moisture derived at least in part from a water supply, as the feed grain moves in a downstream direction from a first location toward a second location, comprising;
   grain conveying means for moving the grain in said downstream direction, having a sensing station and a wetting station located downstream of the sensing station;
   a moisture sensor of the type to continuously monitor moisture content of grain and convert the measurement into an electronic signal, positioned at the sensing station located to intercept a sample of passing feed grain for substantially continuous measurement of the moisture content of the sample and translation of the measurement into an electronic signal;
   liquid applicator means located at the wetting station positioned to disperse liquid derived at least in part from a water supply upon passing feed grain;
   a liquid supply line connected to the liquid applicator means and for connection to the water supply;
   an automatic valve connected in the liquid supply line having an electronically actuated valve control movable between relatively open and relatively closed positions to regulate the amount of liquid flow to the liquid applicator means for application to passing feed grain;

means connecting the moisture sensor to the valve control so that the valve control operates responsive to the electronic signal generated by the moisture sensor according to the difference between the moisture content of the grain sample as sensed by the moisture sensor and the target moisture content, said means including calibrated means connected between the moisture sensor and the automatic valve control for regulation of the valve control by the signal from the moisture sensor calibrated according to a known moisture content of the type of feed grain to be conditioned.

2. The feed grain conditioning apparatus of claim 1 wherein the apparatus is adapted for conditioning a first type of feed grain and said calibrated means including:
a first signal converter terminal connected between the moisture sensor electronic output and the automatic valve control and calibrated with reference to the first type of feed grain at a target moisture level for electronic output to regulate the automatic valve control according to the electronic signal generated by the moisture sensor derived from movement of the first type of feed grain sample through the moisture sensor.

3. A feed grain conditioning apparatus adapted for separately conditioning a first type of feed grain and a second type of feed grain to bring the moisture content of the feed grain to an approximate target moisture content for each type of grain through the addition of moisture derived at least in part from a water supply, as the feed grain moves in a downstream direction from a first location toward a second location, comprising:
grain conveying means for moving the grain in said downstream direction, having a sensing station and a wetting station located downstream of the sensing station;
a moisture sensor of the type to continuously monitor moisture content of grain and convert the measurement into an electronic signal, positioned at the sensing station located to intercept a sample of passing feed grain for substantially continuous measurement of the moisture content of the sample and translation of the measurement into an electronic signal;
liquid applicator means located at the wetting station positioned to disperse liquid derived at least in part from a water supply upon passing feed grain;
a liquid supply line connected to the liquid applicator means and for connection to the water supply;
an automatic valve connected in the liquid supply line having an electronically actuated valve control moveable between relatively open and relatively closed positions to regulate the amount of liquid flow to the liquid applicator means for application to passing feed grain;
means connecting the moisture sensor to the valve control so that the valve control operates responsive to the electronic signal generated by the moisture sensor according to the difference between the moisture content of the grain sample as sensed by the moisture sensor and the target moisture content, said means including calibrated means connected between the moisture sensor and the automatic valve control for regulation of the valve control by the signal from the moisture sensor according to a type of feed grain to be conditioned;
said calibrated means including a first singnal converter terminal connected between the moisture sensor electronic output and the automatic valve control and calibrated with reference to the first type of feed grain at a target moisture level for electronic output to regulate the automatic valve control according to the electronic signal generated by the moisture sensor derived from movement of the first type of feed grain sample through the moisture sensor and a second signal converter terminal connected between the moisture sensor electronic output and the automatic valve control and calibrated with reference to the second type of feed grain at a target moisture content for electronic output to regulate the automatic valve control according to electronic signal generated by the moisture sensor derived from movement of the second type of feed grain sample through the moisture sensor; and
switch means for switching between first signal converter terminal output and the second signal converter terminal output to the automatic valve control.

4. The feed grain conditioning apparatus of claim 1 including: a supply means to supply liquid additive for mixture with the water for application to the feed grain, means connecting the additive supply means to the liquid supply line for mixture of additive and water prepatory to application to feed grain.

5. The feed grain conditioning apparatus of claim 4 including:
an additive pump connected to an additive supply container, and an additive supply line connected between the additive pump and the liquid supply line to supply an additive in regulated amounts to the liquid supply line for mixing with the water prepatory to application to the feed grain.

6. The feed grain conditioning apparatus of claim 5 wherein said wetting station includes:
a mixing chamber for transfer of grain from the sensing station past the wetting station, said liquid applicator means communicating with the mixing chamber, means for moving the grain through the mixing chamber and mixing the liquid with the feed grain and moving it toward the second location.

7. The feed grain conditioning apparatus of claim 6 wherein:
said mixing chamber is an auger housing, and said means for moving the feed grain in the auger housing comprises an auger.

8. The feed grain conditioning apparatus of claim 6 including:
means sensing the volumetric flow of water from the water supply connected to the additive pump control to regulate the flow of additive according to the volumetric flow of water.

9. The feed grain conditioning apparatus of claim 5 including:
means sensing the volumetric flow rate of water from the water supply means connected to the additive pump control to regulate the flow of additive according to the volumetric flow of water.

10. The feed grain conditioning apparatus of claim 1 including:
a moisture sensor housing disposed at said sensing station having an inlet and an outlet for transfer of the feed grain;
said moisture sensor being mounted in the housing and having a tubular inlet and tubular outlet disposed perpendicular to the direction of movement of grain to intercept a sample of grain and measure the moisture content of the passing grain.

11. The feed grain conditioning apparatus of claim 10 including:
capacitance measurement means associated with the moisture sensor to measure the moisture content of passing feed grain.

12. The feed grain conditioning apparatus of claim 10 wherein:
said liquid applicator means is comprised as a spray nozzle.

13. The feed grain conditioning apparatus of claim 1 wherein:
the liquid applicator means is comprised as a spray nozzle.

14. A feed grain conditioning apparatus for conditioning of feed grain through the addition of moisture derived at least in part from a water supply as the feed grain moves on grain conveying means from an upstream location to a downstream location in order to bring the moisture content of the grain to an approximate uniform target moisture content, comprising:
a moisture sensor adapted to continuously measure moisture content of a passing grain and translate the measurement into an electronic signal, and means for positioning the moisture sensor with respect to the grain conveying means to intercept a sample of passing feed grain and measure the moisture content of it;
a liquid applicator, means for positioning the liquid applicator downstream of the moisture sensor in a location to apply liquid to passing feed grain;
a liquid line connected to the liquid applicator at one end and connectable to a water supply;
automatic valve means interposed in the liquid line to regulate the flow of liquid through the liquid line to the liquid applicator, said valve means having electronic control means to move the valve means between relatively open and relatively closed positions to regulate liquid flow;
said control means being electronically connected to the moisture sensor signal output for control by the electronic signal of the moisture sensor generated by feed grain moisture content measurement, said connection including calibrated means connected between the moisture sensor and the control means of the valve means for adjustment of the valve means by the signal generated from the moisture sensor calibrated according to a known moisture content of the type of feed grain to be conditioned.

15. The feed grain conditioning apparatus of claim 14 including:
a mixing chamber for mixing feed grain with moisture, said mixing chamber positioned for receipt of feed grain at a location downstream of the moisture sensor, said liquid applicator connected to the mixing chamber for application of liquid to feed grain located therein.

16. The feed grain conditioning apparatus of claim 15 wherein:
said mixing chamber is comprised as an auger housing, and including auger means located in the auger housing in position to move grain in the downstream direction while mixing the feed grain and liquid from the liquid applicator.

17. The feed grain conditioning apparatus of claim 16 wherein:
said liquid applicator is comprised as a spray nozzle.

18. The feed grain conditioning apparatus of claim 15 including:
a supply container for liquid additive for mixture with the water for application to the feed grain, means connecting the additive supply container to the liquid supply line for mixture of the additive and the water prepatory to application to the feed grain.

19. The feed grain conditioning apparatus of claim 18 including:
an additive pump connected to the additive supply container, said means connecting the additive supply to the liquid supply line comprising an additive supply line connected between the additive pump and the liquid supply line to supply additive in regulated amounts to the liquid supply line for mixing with the water prepatory to application to the feed grain.

20. The feed grain conditioning apparatus of claim 19 including:
means associated with the additive pump to regulate the amount of additive pumped through the additive supply line according to the volumetric flow of water through the liquid supply line.

21. The feed grain conditioning apparatus of claim 20 wherein:
said mixing chamber is comprised as an auger housing, and including an auger located in the auger housing, and means for rotation of the auger to mix the feed grain and liquid and to move the feed grain in a downstream direcion.

22. The feed grain conditioning apparatus of claim 21 wherein:
said liquid applicator is comprised as a spray nozzle.

23. The feed grain conditioning apparatus of claim 14 including:
a moisture sensor housing having a feed grain inlet and outlet, said moisture sensor being mounted in the moisture sensor housing and havinng a tubular inlet and outlet disposed perpendicular to the direction of movement of grain to intercept a sample of the grain and measure the moisture content of the passing grain.

24. The feed grain conditioning apparatus of claim 23 including:
a mixing chamber for mixing of feed grain with moisture, said mixing chamber being comprised as an auger housing, said spray applicator being comprised as a spray nozzle connected to the auger housing to spray liquid inside of the auger housing;
an auger located in the auger housing, means for rotation of the auger for mixing of the feed grain and liquid and movement of the feed grain in a downstream direction.

25. A feed grain conditioning apparatus adapted for conditioning of a first type of feed grain and a second type of feed grain through the addition of moisture derived at least in part from a water supply as the feed grain moves on a grain conveying means from an upstream location to a downstream location in order to bring the moisture content of the grain to an approximate uniform target moisture content, comprising:
a moisture sensor adapted to continuously measure moisture content of a passing grain and translate the measurement into an electronic signal, and means for positioning the moisture sensor with respect to the grain conveying means to intercept a sample of passing feed grain and measure the moisture content of it;

a liquid applicator, means for positioning the liquid applicator downstream of the moisture sensor in a location to apply liquid to passing feed grain;

a liquid line connected to the liquid applicator at one end and connectable to a water supply;

a mixing chamber for mixing feed grain with moisture, said mixing chamber positioned for receipt of feed grain at a location downstream of the moisture sensor, said liquid applicator connected to the mixing chamber for application of liquid to feed grain located therein, said mixing chamber comprised as an auger housing and including auger means located in the auger housing in position to move grain in the downstream direction while mixing the feed grain and liquid from the liquid applicator;

automatic valve means interposed in the liquid line to regulate the flow of liquid through the liquid line to the liquid applicator, said valve means having electronic control means to move the valve means between relatively open and relatively closed positions to regulate liquid flow;

said control means being electronically connected to the moisture sensor signal output for control by the electronic signal of the moisture sensor generated by feed grain moisture content measurement, said connection including calibrated means connected between the moisture sensor and the control means of the valve means for adjustment of the valve means by the signal generated from the moisture sensor according to a type of feed grain to be conditioned;

said calibrated means including a first signal converter terminal connected between the moisture sensor electronic output and the control means of the automatic valve means, and calibrated with reference to a target moisture content of the first type of feed grain for electronic output to regulate the control means according to the electronic signal from the moisture sensor derived from movement of the first type of feed grain sample through the moisture sensor;

a second signal converter terminal connected between the moisture sensor electronic output and the control means of the valve means, and calibrated with reference to a target moisture content of the second type of feed grain for electronic output to regulate the control means according to the electronic signal from the moisture sensor derived from movement of the second type of feed grain sample through the moisture sensor;

and switch means for switching between the first signal converter terminal output and the second signal converter terminal output to the control means of the valve means.

* * * * *

REEXAMINATION CERTIFICATE (2115th)

United States Patent [19]

Greer

[11] B1 4,898,092

[45] Certificate Issued  Oct. 26, 1993

[54] FEED GRAIN CONDITIONING APPARATUS

[75] Inventor: David G. Greer, Anoka, Minn.

[73] Assignee: AgriChem, Inc., Anoka, Minn.

Reexamination Request:
No. 90/002,937, Jan. 25, 1993

Reexamination Certificate for:
Patent No.: 4,898,092
Issued: Feb. 6, 1990
Appl. No.: 191,378
Filed: May 9, 1988

[51] Int. Cl.$^5$ .............................................. A23N 17/00
[52] U.S. Cl. ........................................ 99/487; 99/516; 99/536
[58] Field of Search ........................ 99/487, 516, 536; 366/132, 156, 182

[56] References Cited

U.S. PATENT DOCUMENTS

| | | | |
|---|---|---|---|
| 4,336,660 | 6/1982 | Strydom | 34/28 |
| 4,499,111 | 2/1985 | Oetiker et al. | 42/23 |
| 4,561,781 | 12/1985 | Seymour | 366/132 |

FOREIGN PATENT DOCUMENTS

| | | |
|---|---|---|
| 2065492 | 3/1970 | Fed. Rep. of Germany . |
| 2055059 | 2/1981 | United Kingdom . |
| WO87/06434 | 11/1981 | World Int. Prop. O. . |

OTHER PUBLICATIONS

Bontoon Polytechnic Company brochure entitled The Bontoon Miltrol System from the Moisture Bulletin, vol. 1, Nov. 5, 1964.
Dickey-john brochure entitled Continuous Flow Moisture Monitors, date unknown.
Process Automation Systems brochure published by Agridustrial Electronics, Inc. (Subsidiary of Dickey-john Corp.), Jun. 1, 1983, pp. 11-12.
Instruction manual for Dickey john Continuous Flow moisture monitor, Sep. 16, 1982.
Aug. 1971, Milling Flour & Feed Magazine articled entitled Measurement and control of moisture in cereals, pp. 8-11.
American Miller & Processor entitled Bacteria Control in the Flour Milling Operation, Dec. 1961.
Bulletin-Association of Operative Millers entitled Effects of Water Chlorination on the Microbiological Flora of Wheat Flour, Feb. 1965.
Flour Mill Burgholz Diemtigen—A new flour mill in the Bernese Oberland, date unknown.
Automatic Moisture Control Aquatron, date unknown.
Chlorination of Wheat Wash and Tempering Water, Oct. 14 & 15, 1955.
Maschinenkunde Fur Muller, Arthur W. Rohner, date unknown.
Machine Manual for Millers, Arthur W. Rohner, date unknown.
Screenroom Operations I, First Edition 1988.
APAC III Delivers Optimum Moisture Control, date unknown.
APAC III Feedforward Controller Operator's Manual, date unknown.

Primary Examiner—Timothy F. Simone

[57] ABSTRACT

This invention is an apparatus and method for automatically adjusting the moisture content of feed gains to a relatively constant target level. As the grain is transported into, or within the feed manufacturing process, a sample is diverted through a continuous flow moisture sensor. The sensor generates an electronic signal proportional to the moisture content of the grain. This signal is used to control the application rate of a surfactant—water mixture, or of water alone. The water may be either in the form of steam or, as a hot or cold liquid. The grain then enters a mixing or contact chamber, into which the water is metered at a rate that is proportional to the moisture content of the incoming grain. The treated grain will have a relatively constant moisture content, eliminating one of the largest variables in the manufacturing of livestock feeds.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3 and 25 is confirmed.

Claims 4–7, 15, 16, 18, 19 are cancelled.

Claims 1, 8, 9, 14, 17, 20 are determined to be patentable as amended.

Claims 2, 10–13, 21–24, dependent on an amended claim, are determined to be patentable.

1. A feed grain conditioning apparatus for conditioning of feed grain to bring the moisture content to an approximate target moisture content through the addition of moisture derived at least in part from a water supply, as the feed grain moves in a downstream direction from a first location toward a second location, comprising:
   grain conveying means for moving the grain in said downstream direction, having a sensing station and a wetting station located downstream of the sensing station;
   a moisture sensor of the type to continuously monitor moisture content of grain and convert the measurement into an electronic signal, positioned at the sensing station located to intercept a sample of passing feed grain for substantially continuous measurement of the moisture content of the sample and translation of the measurement into an electronic signal;
   liquid applicator means located at the wetting station positioned to disperse liquid derived at least in part from a water supply upon passing feed grain;
   a liquid supply line connected to the liquid applicator means and for connection to the water supply;
   an automatic valve connected in the liquid supply line having an electronically actuated valve control moveable between relatively open and relatively closed positions to regulate the amount of liquid flow to the liquid applicator means for application to passing feed grain;
   means connecting the moisture sensor to the valve control so that the valve control operates responsive to the electronic signal generated by the moisture sensor according to the difference between the moisture content of the grain sample as sensed by the moisture sensor and the target moisture content, said means including calibrated means connected between the moisture sensor and the automatic valve control for regulation of the valve control by the signal from the moisture sensor calibrated according to a known moisture content of the type of feed grain to be conditioned;
   *a supply means to supply liquid additive for mixture with the water for application to the feed grain, means connecting the additive supply means to the liquid supply line for mixture of additive and water preparatory to application to feed grain, including an additive pump connected to an additive supply container, and an additive supply line connected between the additive pump and the liquid supply line to supply an additive in regulated amounts to the liquid supply line for mixing with the water preparatory to application to the feed grain;*
   *said wetting station including a mixing chamber for transfer of grain from the sensing station past the wetting station, said liquid applicator means communicating with the mixing chamber, means for moving the grain through the mixing chamber and mixing the liquid with the feed grain and moving it toward the second location;*
   *said mixing chamber being an auger housing, and said means for moving the feed grain in the auger housing comprising an auger.*

8. The feed grain conditioning apparatus of claim [6] *1* including: means sensing the volumetric flow of water from the water supply connected to the additive pump control to regulate the flow of additive according to the volumetric flow of water.

9. The feed grain conditioning apparatus of claim [5] *1* including: means sensing the volumetric flow rate of water from the water supply means connected to the additive pump control to regulate the flow of additive according to the volumetric flow of water.

14. A feed grain conditioning apparatus for conditioning of feed grain through the addition of moisture derived at least in part from a water supply as the feed grain moves on grain conveying means from an upstream location to a downstream location in order to bring the moisture content of the grain to an approximate uniform target moisture content, comprising:
   a moisture sensor adapted to continuously measure moisture content of a passing grain and translate the measurement into an electronic signal, and means for positioning the moisture sensor with respect to the grain conveying means to intercept a sample of passing feed grain and measure the moisture content of it;
   a liquid applicator, means for positioning the liquid applicator downstream of the moisture sensor in a location to apply liquid to passing feed grain;
   a liquid line connected to the liquid applicator at one end and connectable to a water supply;
   automatic valve means interposed in the liquid line to regulate the flow of liquid through the liquid line to the liquid applicator, said valve means having electronic control means to move the valve means between relatively open and relatively closed positions to regulate liquid flow;
   said control means being electronically connected to the moisture sensor signal output for control by the electronic signal of the moisture sensor generated by feed grain moisture content measurement, said connection including calibrated means connected between the moisture sensor and the control means of the valve means for adjustment of the valve means by the signal generated from the moisture sensor calibrated according to a known moisture content of the type of feed grain to be conditioned;
   *a mixing chamber for mixing feed grain with moisture, said mixing chamber positioned for receipt of feed* grain at a location downstream of the moisture sensor, said liquid applicator connected to the mixing chamber for application of liquid to feed grain located therein;

said mixing chamber comprised as an auger housing, and including auger means located in the auger housing in position to move grain in the downstream direction while mixing the feed grain and liquid from the liquid applicator;

a supply container for liquid additive for mixture with the water for application to the feed grain, means connecting the additive supply container to the liquid supply line for mixture of the additive and the water prepatory to application to the feed grain, including an additive pump connected to the additive supply container, said means connecting the additive supply to the liquid supply line comprising an additive supply line connected between the additive pump and the liquid supply line to supply additive in regulated amounts to the liquid supply line for mixing with the water prepartory to application to the feed grain.

17. The feed grain conditioning apparatus of claim [16] *14* wherein: said liquid applicator is comprised as a spray nozzle.

20. The feed grain conditioning apparatus of claim [19] *14* including: means associated with the additive pump to regulate the amount of additive pumped through the additive supply line according to the volumetric flow of water through the liquid supply line.

* * * * *